(12) United States Patent
Mitsuno

(10) Patent No.: US 6,826,132 B2
(45) Date of Patent: Nov. 30, 2004

(54) DATA RECORDING APPARATUS AND METHOD, AND DATA RECORDING AND/OR REPRODUCING APPARATUS AND METHOD

(75) Inventor: Makoto Mitsuno, Chiba (JP)

(73) Assignee: Sony Corporation, Tokyo (JP)

( * ) Notice: Subject to any disclaimer, the term of this patent is extended or adjusted under 35 U.S.C. 154(b) by 626 days.

(21) Appl. No.: 09/810,991

(22) Filed: Mar. 16, 2001

(65) Prior Publication Data

US 2001/0012246 A1 Aug. 9, 2001

Related U.S. Application Data

(63) Continuation of application No. 09/297,549, filed as application No. PCT/JP98/03985 on Sep. 4, 1998, now Pat. No. 6,219,311.

(30) Foreign Application Priority Data

Sep. 5, 1997 (JP) ............................................. P9-241510

(51) Int. Cl.⁷ .............................................. G11B 21/08
(52) U.S. Cl. ................. 369/30.23; 369/126; 369/47.15; 369/53.11
(58) Field of Search ............................ 369/30.23, 126, 369/47.15, 53.11, 47.33, 30.27, 24.06, 47.3, 53.2, 275.3, 53.1, 124.01; 386/96, 125, 126

(56) References Cited

U.S. PATENT DOCUMENTS

| 5,325,347 | A | | 6/1994 | Sako .......................... 369/47.3 |
| 5,337,295 | A | | 8/1994 | Maeda ..................... 369/30.27 |
| 5,671,204 | A | | 9/1997 | Yokouchi et al. ......... 369/47.33 |
| 5,936,926 | A | | 8/1999 | Yokouchi et al. ......... 369/47.33 |
| 6,192,189 | B1 | * | 2/2001 | Fujinami et al. .............. 386/96 |
| 6,219,311 | B1 | * | 4/2001 | Mitsuno ................... 369/30.23 |

FOREIGN PATENT DOCUMENTS

| JP | 6-28773 | 2/1994 |
| JP | 6-275024 | 9/1994 |

* cited by examiner

*Primary Examiner*—Ali Neyzari
(74) *Attorney, Agent, or Firm*—Frommer Lawrence Haug LLP; William S. Frommer; Dennis M. Smid

(57) ABSTRACT

A data recording and/or reproducing method and apparatus. The apparatus may include one or more buffer memories, a recorder, a controller, and/or a reproducing unit. Continuous picture and/or speech data may be stored, recorded, and/or reproduced. The size of a recording unit may be controlled such that it corresponds to the amount of picture and/or speech data recorded by the recorder.

16 Claims, 10 Drawing Sheets

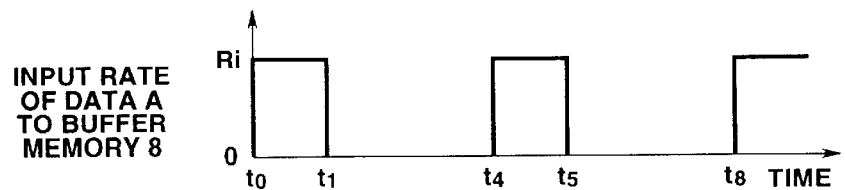
FIG.3 INPUT RATE OF DATA A TO BUFFER MEMORY 8
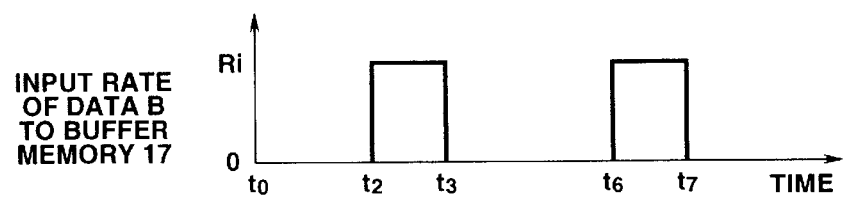
FIG.4 INPUT RATE OF DATA B TO BUFFER MEMORY 17
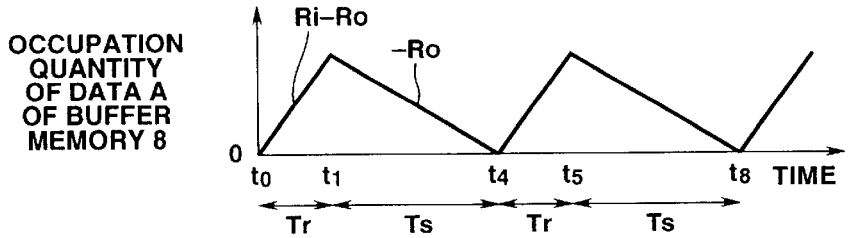
FIG.5 OCCUPATION QUANTITY OF DATA A OF BUFFER MEMORY 8
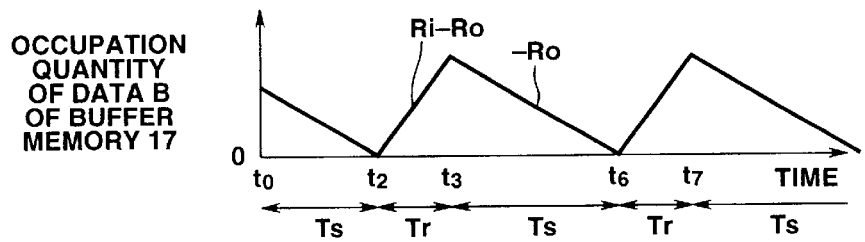
FIG.6 OCCUPATION QUANTITY OF DATA B OF BUFFER MEMORY 17
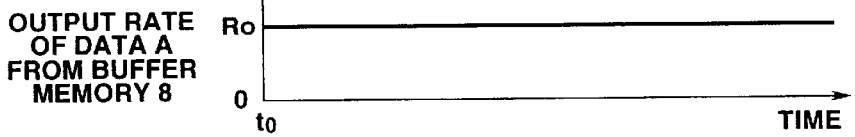
FIG.7 OUTPUT RATE OF DATA A FROM BUFFER MEMORY 8
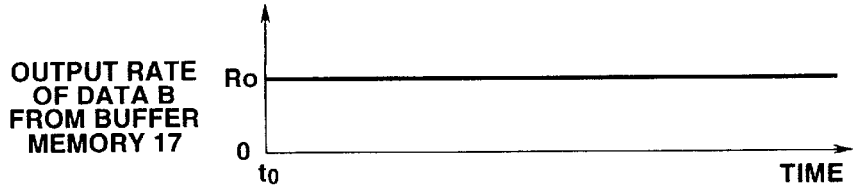
FIG.8 OUTPUT RATE OF DATA B FROM BUFFER MEMORY 17

DATA RECORDING APPARATUS AND METHOD, AND DATA RECORDING AND/OR REPRODUCING APPARATUS AND METHOD

This is a continuation of prior application Ser. No. 09/297,549 filed Oct. 19, 1999, now U.S. Pat. No. 6,219,311 which is a 371 of PCT/JP98/03985 filed Sep. 4, 1998.

TECHNICAL FIELD

This invention relates to a disc recording method and a disc recording apparatus for recording, onto a disc-shaped recording medium, various data continuous in point of time and/or capacity such as picture, speech or musical sound (tone), and a disc-shaped recording medium on which various data continuous in point of time and/or capacity such as picture, speech or musical sound, etc. have been recorded.

BACKGROUND ART

In the case of recording, onto a recording medium, various data continuous in point of time and/or capacity, e.g., picture data, speech data or musical sound data, etc., i.e., data to be continuously outputted at the time of reproduction (hereinafter referred to as picture musical sound data), such an approach is ordinarily employed to write those data into continuous areas on the recording medium. Particularly, with respect to the tape-shaped recording medium, since it is very difficult to momentarily provide access to discontinuous areas, in the case of recording the picture musical sound data onto such tape-shaped recording medium, such an approach is typically employed to write those data into continuous areas.

In addition, also in the case of recording those picture musical sound data onto a write once type disc shaped recording medium (only once writable disc), such an approach is typically employed to write those data into continuous areas in a manner similar to the tape-shaped recording medium.

However, e.g., in rewritable disc-shaped recording medium (rewritable disc), works for once writing data thereafter to delete (erase) such data are repeated. For this reason, in the case of recording those picture musical sound data onto the rewritable disc, when an approach is adopted to write those data into continuous areas in a manner similar to the case of the tape-shaped recording medium, there are instances where vast unusable space (blank) areas may resultantly take place.

Explanation will be given with reference to FIG. 1 in connection with the mechanism in which recording and deletion (erasing) operations of various picture musical sound data continuous in point of time and/or capacity are repeated, whereby unusable space areas take place on the rewritable disc. Dotted lines in the figure indicate recordable space areas existing on the rewritable disc and double (solid) lines in the figure indicate already recorded areas existing on the rewritable disc.

Initially, in the state of (1), the rewritable disc is assumed to be in initial (initialized) state, i.e., recording areas are assumed to be all recordable space areas. Namely, the rewritable disc is placed in the state of blank disc. Usable space (blank) area of the rewritable disc at this time point (i.e., total capacity of the disc) is assumed to be 100.

Subsequently, in the state of (2), e.g., data A of capacity 25 is recorded with respect to the rewritable disc placed in the initial state of (1). Subsequently, in the state of (3), e.g., data B of capacity 50 is further supplementarily recorded with respect to the rewritable disc placed in the state where the data A has been already recorded. Subsequently, in the state of (4), the data A already recorded in the state of (2) is deleted (erased) from the rewritable disc placed in the state where the data A and the data B have been recorded. At the time point when the data A has been deleted (erased) in the state of (4), usable (available) area on the rewritable disc is separated (divided) and two space (blank) areas respectively having capacity 25 take place (i.e., total space capacity becomes equal to 50).

Subsequently, in the state of (5), let consider the case where data C of capacity 50 is recorded with respect to the rewritable disc placed in the state where the data A has been deleted (erased). In this case, there exists space area of rewritable disc corresponding to capacity 50. However, the space area corresponding to capacity 50 is not continuous space areas, but is separated (divided). For this reason, the data C of capacity 50 cannot be written into the continuous areas. Namely, this means that unusable space areas of total capacity 50 have taken place on the rewritable disc.

Moreover, as a method of using such a rewritable disc, there are instances where plural picture musical sound data reproduced at the same time are recorded at different times. For example, there are instances where picture data and speech data are recorded at times different from each other and the picture data and the speech data which have been recorded at different times are reproduced at the same time.

Further, as a method of using such a rewritable disc, there are instances where plural musical sound data to be reproduced at different times are recorded at the same time. For example, there are instances where plural picture data to be reproduced at different times are recorded at the same time.

Furthermore, as a method of using such a rewritable disc, there are instances where plural picture musical sound data to be reproduced at the same time are recorded at the same time. For example, there are instances where picture data and speech data are respectively recorded at the same time and the picture data and the speech data which have been recorded at the same time are simultaneously reproduced.

In addition, as a method of using such a rewritable disc, there are instances where already recorded plural picture musical sound data are reproduced at the same time while recording plural picture musical sound data.

Also in the case of carrying out recording onto the rewritable disc by using such use methods, when writing is carried out with respect to continuous areas in a manner similar to the case of the tape-shaped recording medium, vast unusable space areas would resultantly take place.

In addition, when picture musical sound data are recorded in a distributed manner as they are with respect to separated usable space areas, one or plural picture musical sound data cannot be continuously outputted simultaneously at the time of reproduction.

An object of this invention is to provide a disc recording method in which in the case where various data continuous in point of time and/or capacity such as picture, speech or musical sound, etc. are recorded onto rewritable disc-shaped recording medium, unusable space areas on such disc-shaped recording medium are reduced so that disc capacity can be efficiently used.

Another object of this invention is to provide a disc recording apparatus in which in the case where various data continuous in point of time and/or capacity such as picture, speech or musical sound, etc. are recorded onto rewritable disc-shaped recording medium, unusable space areas on such disc-shaped recording medium are reduced so that disc capacity can be efficiently used.

A further object of this invention is to provide a disc-shaped recording medium wherein various data continuous in point of time and/or capacity such as picture, speech or musical sound, etc. are recorded in the state where unusable space areas are reduced so that disc capacity can be efficiently used.

DISCLOSURE OF THE INVENTION

A disc recording method of this invention is directed to a disc recording method for recording data to be continuously reproduced (continuous reproduction data) onto a disc-shaped recording medium, wherein when input rate to a buffer memory of the continuous reproduction data which has or have been intermittently read out from the disc-shaped recording medium is assumed to be Ri, output rate of the continuous reproduction data continuously outputted from the buffer memory is assumed to be Ro, either larger one of total number of continuous reproduction data to be recorded and reproduced at the same time in (at the time of) recording the continuous reproduction data onto the disc-shaped recording medium and total number of continuous reproduction data to be recorded and reproduced at the same time in (at the time of) reproducing the continuous reproduction data from the disc-shaped recording medium is assumed to be N, maximum seek time of a reproduction head for reproducing data from the disc-shaped recording medium is assumed to be Tj, and minimum read time in reading out data from the disc-shaped recording medium is assumed to be Tr, minimum continuous recording unit Ba of the continuous reproduction data is set as $$Ba=[Ri \times Ro \times \{(N-1) \times Tr + N \times Tj\}]/(Ri-Ro),$$

thus to record the continuous reproduction data on the real time basis every data quantity of the minimum continuous recording unit Ba or more in a distributed manner with respect to the disc-shaped recording medium.

In this disc recording method, such a procedure is taken to set minimum continuous recording unit Ba to record, on the real time basis, continuous reproduction data in a distributed manner every data quantity of the minimum continuous recording unit Ba or more.

A disc recording apparatus of this invention is directed to a disc recording apparatus adapted for recording data to be continuously reproduced (continuous reproduction data) onto a disc-shaped recording medium, the apparatus comprising an input unit to which the continuous reproduction data is or are continuously inputted, a buffer memory for temporarily storing the continuous reproduction data inputted thereto, a writing unit for intermittently writing continuous reproduction data stored in the buffer memory onto the disc-shaped recording medium, and a control unit for controlling the writing unit to control writing position of continuous reproduction data to be recorded onto the disc-shaped recording medium, the control unit being such that when input rate to a buffer memory of a reproducing apparatus (unit) of the continuous reproduction data which has or have been intermittently read out from the disc-shaped recording medium is assumed to be Ri, output rate of the continuous reproduction data continuously outputted from the buffer memory of the reproducing unit is assumed to be Ro, either larger one of total number of continuous reproduction data to be recorded and reproduced at the same time in recording the continuous reproduction data onto the disc-shaped recording medium and total number of continuous reproduction data to be recorded and reproduced at the same time in reproducing the continuous reproduction data from the disc-shaped recording medium is assumed to be N, maximum seek time of a reproduction head for reproducing data from the disc-shaped recording medium is assumed to be Tj, and minimum read time in reading out data from the disc-shaped recording medium is assumed to be Tr, minimum continuous recording unit Ba of the continuous reproduction data is set as $$Ba=[Ri \times Ro \times \{(N-1) \times Tr + N \times Tj\}]/(Ri-Ro),$$

thus to record the continuous reproduction data on the real time basis every data quantity of the minimum continuous recording unit Ba or more in a distributed manner with respect to the disc-shaped recording medium.

In this disc recording apparatus, such an approach is employed to set minimum continuous recording unit Ba to record, on the real time basis, continuous reproduction data in a distributed manner every data quantity of the minimum continuous recording unit Ba or more.

A disc-shaped recording medium of this invention is directed to a disc-shaped recording medium on which one or plural data to be continuously reproduced (continuous reproduction data) is or are recorded, wherein when input rate when the continuous reproduction data which has or have been intermittently read out is or are inputted to a buffer memory of a reproducing apparatus (unit) is assumed to be Ri, output rate of the continuous reproduction data continuously outputted from the buffer memory of the reproducing unit is assumed to be Ro, total number of continuous reproduction data to be recorded and reproduced at the same time in reproducing the continuous reproduction data is assumed to be N, maximum seek time of a reproduction head when the reproducing unit reproduces continuous reproduction data is assumed to be Tj, and minimum read time in reading out continuous reproduction data is assumed to be Tr, minimum continuous recording unit Ba of the continuous reproduction data is set as $$Ba=[Ri \times Ro \times \{(N-1) \times Tr + N \times Tj\}]/(Ri-Ro),$$

and wherein the continuous reproduction data is or are recorded on the real time basis every data quantity of the minimum continuous recording unit Ba or more in a distributed manner.

BRIEF DESCRIPTION OF THE DRAWINGS

FIG. 3 is a view indicating input rate of multiplexed data A intermittently written into buffer memory at the time of reproduction of disc.

FIG. 4 is a view indicating input rate of multiplexed data B intermittently written into buffer memory at the time of reproduction of the disc.

FIG. 5 is a view indicating change of data occupation quantity of multiplexed data A in the buffer memory at the time of reproduction of the disc.

FIG. 6 is a view indicating change of data occupation quantity of multiplexed data B in the buffer memory at the time of reproduction of the disc.

FIG. 7 is a view indicating output rate of multiplexed data A continuously read out at constant (fixed) rate from the buffer memory at the time of reproduction of the disc.

FIG. 8 is a view indicating output rate of multiplexed data B continuously read out at a constant rate from the buffer memory at the time of reproduction of the disc.

BEST MODE FOR CARRYING OUT THE INVENTION

A preferred embodiment of this invention will now be described with reference to the attached drawings.

Figure 1:
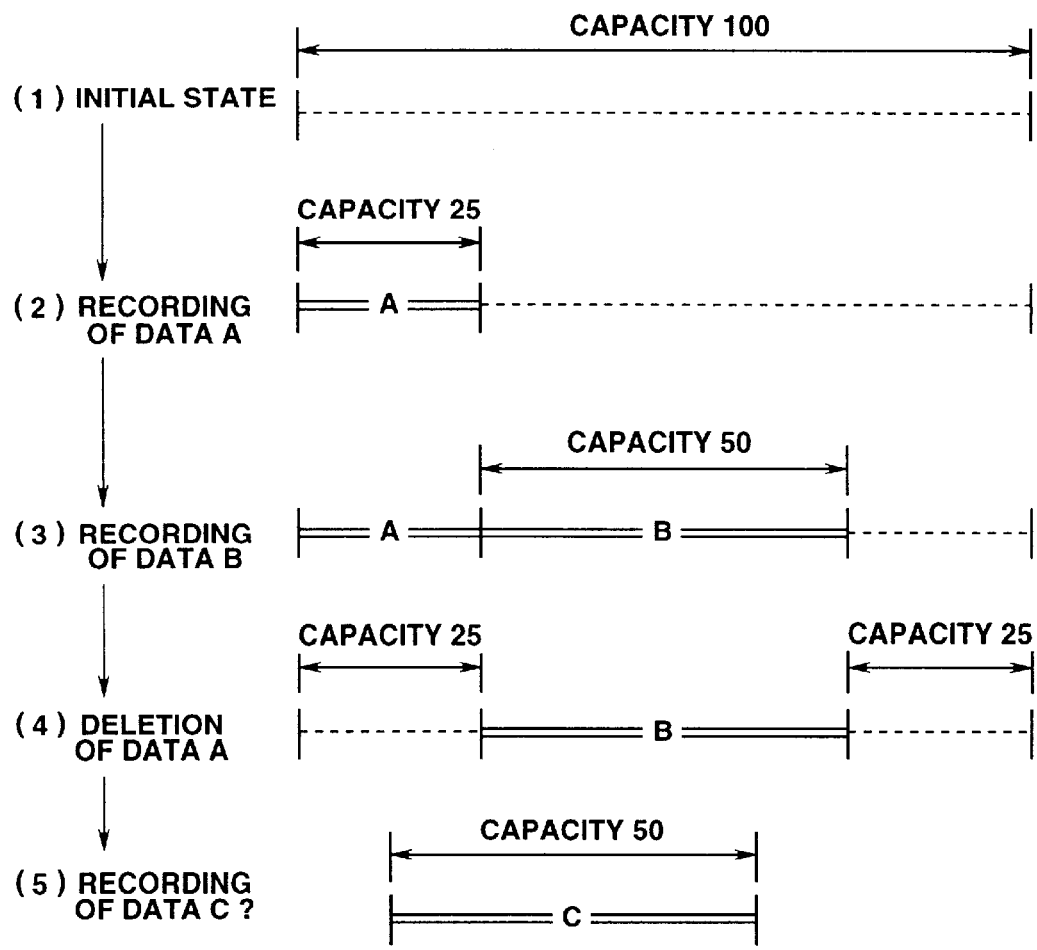
FIG. 1 is a view for explaining the mechanism in which recording and erasing of data are repeated with respect to rewritable disc, whereby unusable space areas take place.
Figure 2:
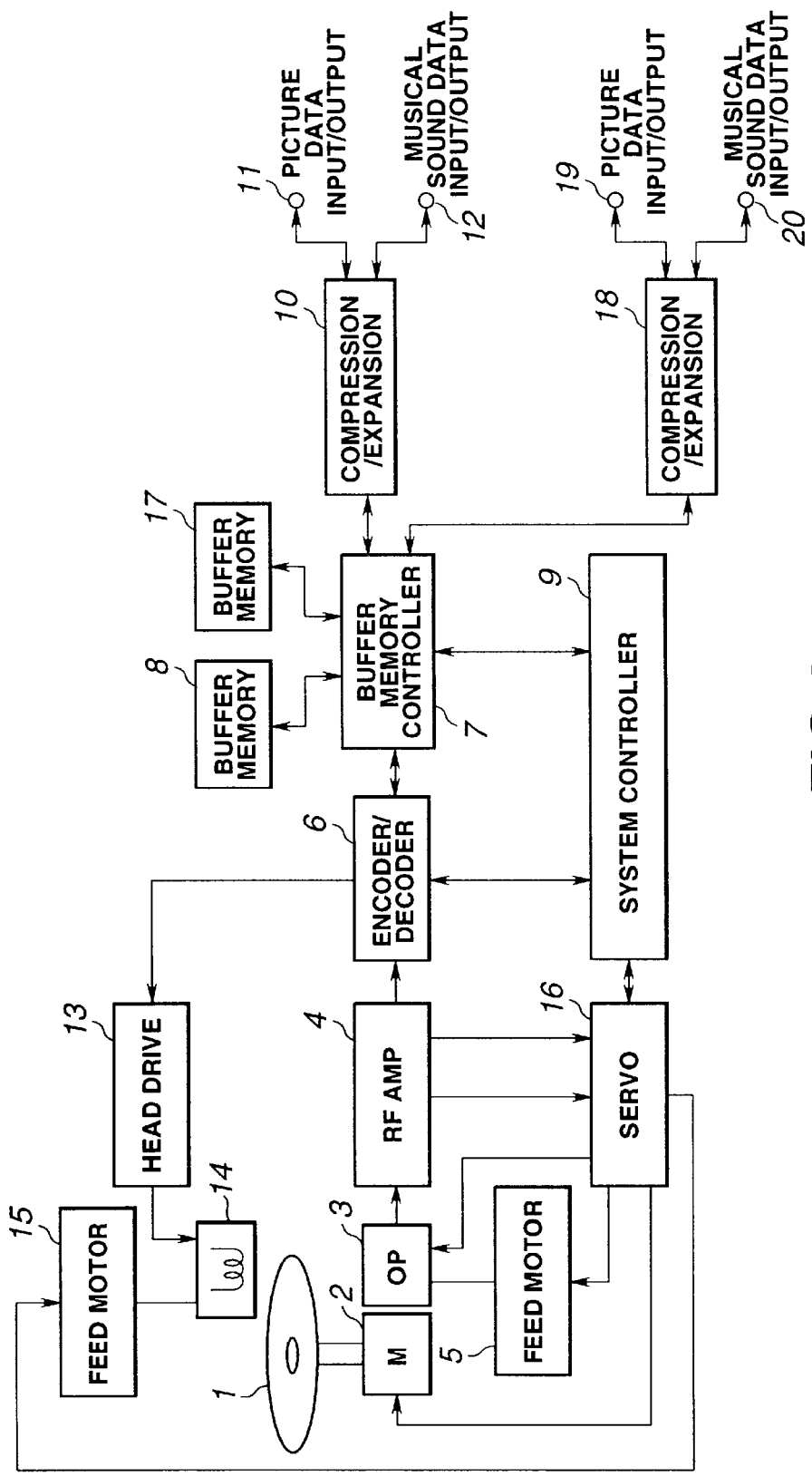
FIG. 2 is a block diagram showing outline of the configuration of a disc recording/reproducing apparatus of an embodiment for realizing this invention.

Outline of the configuration of a disc recording/reproducing apparatus as the embodiment for realizing this invention is shown in FIG. 2. In the explanation of this embodiment, the example where magneto-optical disc is used as the disc-shaped recording medium is taken. Hereinafter, such disc-shaped recording medium will be simply called "disc".

The disc recording/reproducing apparatus (unit) of the embodiment for realizing this invention comprises, as shown in FIG. 2, an optical head 3 for irradiating laser beams onto a disc 1, a RF amplifier 4 for taking out a reproduction signal, an encoder/decoder circuit 6 for carrying out decode operation (decoding) of reproduction signal and encode operation (encoding) of recording signal, a buffer memory controller 7 for controlling a buffer memory 8 and a buffer memory 17 in which data are respectively stored, compressing/expanding circuits 10, 18 for compressing and expanding picture data and speech data, input/output terminals 11, 19 for picture data, and input/output terminals 12, 20 for speech data. Moreover, this disc recording/reproducing unit comprises a magnetic head 14 for applying magnetic field to the disc 1 at the time of recording, and a head drive circuit 13 for driving this magnetic head 14. In addition, this disc recording/reproducing unit comprises a spindle motor 2 for rotationally driving the disc 1, a feed motor 5 for driving the sled mechanism of the optical head 3, a feed motor 15 for driving the sled mechanism of the magnetic head 14, a servo circuit 16 for carrying out servo control of focus servo, tracking servo, etc., and a system controller 9 for carrying out control of the entirety of the unit (apparatus).

Explanation will be given in connection with outline of the operation of the reproducing system of the disc recording/reproducing unit (apparatus).

The disc 1 is rotationally driven by the spindle motor 2. Laser beams are irradiated from the optical head 3 onto the disc 1 being rotationally driven. The optical head 3 takes thereinto reflected light from the disc 1 to take out a reproduction signal. To realize this, there are mounted, at the optical head 3, laser diode as laser output means, optical system having function such as polarization beam splitter and object lens (objective) etc., photo detector for detecting reflected light and biaxial actuator for driving the object lens, etc. In addition, this optical head 3 has sled mechanism (not shown), and can be moved in the disc radial (radius) direction by the feed motor 5 of this sled mechanism.

Reproduction signal detected from the disc 1 by the optical head 3 is delivered to the RF amplifier 4. The RF amplifier 4 amplifies this reproduction signal to take out binary reproduction RF signal. Moreover, this RF amplifier 4 extracts data bits from the binary reproduction RF signal and extracts clock. These data bits are sent to the decoder section of the encoder/decoder circuit 6, and the clock is sent to the servo circuit 16. In addition, the RF amplifier 4 also extracts tracking error signal and focus error signal from the reproduction signal to send these error signals to the servo circuit 16.

The servo circuit 16 carries out, on the basis of the clock that the RF amplifier 4 has extracted, rotational servo of the spindle motor 2 for rotationally driving the disc 1. Moreover, the servo circuit 16 drives, in the optical axis direction, the biaxial actuator of the optical head 3 on the basis of the focus error signal that the RF amplifier 4 has extracted to carry out focus servo. Further, the servo circuit 16 drives, in the disc radial (radius) direction, the biaxial actuator of the optical head 3 on the basis of the tracking error signal that the RF amplifier 4 has extracted to carry out tracking servo.

Further, the decoder section of the encoder/decoder circuit 6 to which data bits have been delivered from the RF amplifier 4 carries out demodulation of data bits and error correction processing of data bits, etc. to restore (reconstruct) reproduction data to send this reproduction data to the buffer memory controller 7. Reproduction data outputted from this decoder section is multiplexed data in which picture data and musical sound data compressed by a predetermined encoding system are multiplexed. The buffer memory controller 7 stores (accumulates), by a predetermined quantity, this multiplexed data into corresponding buffer memories 8, 17 every kind thereof. The buffer memory controller 7 sends, to corresponding compressing/expanding circuits 10, 18, every kind thereof, multiplexed data stored (accumulated) in the buffer memories 8, 17. It is to be noted that the number of the buffer memories is not limited to two (2), but three buffer memories or more may be used to store (accumulate) multiplexed data in a divided manner, and single memory may be used in a collective manner.

The compressing/expanding circuits 10, 18 respectively separate multiplexed data sent from the buffer memory controller 7 into compressed picture data and compressed musical sound data to respectively expand, by corresponding expanding sections, the compressed picture data and the compressed musical sound data which have been separated. The expanded picture data is outputted from the terminals 11, 19 and the expanded musical sound data is outputted from the terminals 12, 20.

Explanation will now be given in connection with outline of the operation of the recording system of the disc recording/reproducing unit.

The terminals 11, 19 are supplied with picture data and the terminals 12, 20 are supplied with musical sound data. The picture data and the musical sound data are respectively sent to corresponding compressing sections of the compressing/expanding circuits 10, 18. These compressing sections respectively compress the picture data and the musical sound data which have been delivered by a predetermined compression encoding system. In addition, the compressing/expanding circuits 10, 18 multiplex the picture data and musical sound data which have been compressed to deliver the multiplexed data thus obtained to the buffer memory controller 7.

The buffer memory controller 7 stores (accumulates), by a predetermined quantity, multiplexed data multiplexed by the compressing/expanding circuits 10, 18 into corresponding buffer memories 8, 17 every kind thereof. The buffer memory controller 7 reads out the multiplexed data stored (accumulated) in the buffer memories 8, 17 every kind thereof to send such data to the encoder section of the encoder/decoder circuit 6.

The encoder section of this encoder/decoder circuit 6 implements addition of error correction code and modulation to multiplexed data delivered thereto to send it to the head drive circuit 13 as recording signal.

The head drive circuit 13 drives the magnetic head 14 in accordance with the recording signal delivered from the encoder/decoder circuit 6. The magnetic head 14 is moved to the position opposite to the optical head 3 by the feed motor 15. Moreover, the optical head 3 at the time of recording generates laser beams sufficient to elevate temperature of magnetic recording film on the disc 1 up to the Curie point. Namely, at the time of recording, modulated magnetic field based on the recording signal is applied to the disc 1 from the magnetic head 14, and laser beams are irradiated onto the target track of the disc 1 by the optical head 3 to elevate temperature of the magnetic recording film up to the Curie point to thereby carry out thermal magnetic recording by the so-called magnetic field modulation system.

The system controller 9 serves to control the operation of the entirety of the unit (apparatus), e.g., controls the buffer memory controller 7 as described later to control write/read operation of the buffer memory 8, and controls the magnetic head 14 and its peripheral circuit and the optical head 3 and its peripheral circuit as described later at the time of recording to thereby have ability to carry out efficient recording with respect to the optical disc 1.

It is to be noted that while two multiplexed data at the maximum can be recorded or reproduced at the same time in this disc recording/reproducing unit (apparatus), three compressing/expanding circuits or more may be provided to record or reproduce three multiplexed data or more at the same time. In addition, while two compressing/expanding circuits 10, 18 are provided in this disc recording/reproducing unit (apparatus), there may be provided, e.g., single compressing/expanding circuit having processing ability twice or more greater than individual performances of these compressing/expanding circuits 10, 18.

The operation at the time of recording multiplexed data onto the disc 1 in the disc recording/reproducing unit (apparatus) of the embodiment of this invention constituted in a manner described above will be described below.

In the disc recording/reproducing unit (apparatus) of the embodiment of this invention, even if there is repeated such a work to record, onto the disc 1, multiplexed data consisting of picture data and musical sound data, etc. which are various data continuous in point of time and/or capacity thereafter to delete (erase) it is, whereby e.g., separated (divided) plural space areas take place on the disc 1, recording with respect to these space areas can be carried out. As a result, it becomes possible to efficiently use recording capacity of the disc 1.

In other words, in the disc recording/reproducing unit (apparatus) of the embodiment of this invention, in (at the time of) recording, onto the disc 1, multiplexed data continuously inputted consisting of picture data and musical sound data, etc., while paying attention so as to have ability to continuously reproduce those multiplexed data at the time of the operation of reproduction which will be carried out later, such multiplexed data are recorded, into space areas on the disc 1, on the real time basis in the state disposed (assigned) in a manner distributed thereto.

In more practical sense, in the disc recording/reproducing unit (apparatus) of the embodiment of this invention, even in the case where multiplexed data consisting of picture data and/or musical sound data which are primarily continuous data are recorded in a distributed manner into space (blank) areas on the disc 1 as described above, such an approach is employed at the time of reproduction to once (temporarily) store (accumulate) multiplexed data which have been read out from the disc 1 into the buffer memories 8, 17 to output the multiplexed data as continuous picture data or musical sound data.

Namely, in the case of carrying out, from the disc 1 on which continuous data are recorded in a distributed manner, reproduction of such data, there is required such a reproduction operation to seek the optical head 3 up to the next recording area after read-out operation from a certain one recording area is completed to carry out read-out operation from that recording area thereafter to seek the optical head 3 up to further next recording area after read-out operation from that recording area is completed to carry out read-out operation. However, when such a reproduction operation is carried out, continuous data reproduction cannot be carried out at the time of seek operation of the optical head 3, resulting in no continuity of reproduction data. Namely, reproduction data which are read out from the optical head 3 result in intermittent data. Accordingly, in the disc recording/reproducing unit (apparatus) of the embodiment of this invention, such an approach is employed to once (temporarily) store, into the buffer memories 8, 17, reproduction data which have been intermittently read out to output, from the buffer memories 8, 17 reproduction data at a constant (fixed) rate where continuous reproduction can be made.

Explanation will be given in more practical sense with reference FIGS. 3 to 8 in connection with write/read control of the buffer memories 8, 17 at the time of reproduction as described above. In respective figures of FIGS. 3 to 8, the abscissa indicates time axis and this time axis is common.

FIG. 3 indicates input rate when a certain multiplexed data (hereinafter called multiplexed data A) recorded on the disc 1 is written into the buffer memory 8 at the time of reproduction. As shown in the FIG. 3 mentioned above, multiplexed data A is intermittently written into the buffer memory 8. In more practical sense, multiplexed data A is inputted at input rate Ri at time of t0~t1 and time period of t4~t5, but no data is inputted at time of t1~t4 and time period of t5~t8.

FIG. 7 indicates output rate of multiplexed data A which has been written into the buffer memory 8. As shown in this FIG. 7, the multiplexed data A is continuously outputted from the buffer memory 8. In more practical sense, multiplexed data A is outputted at constant (fixed) output rate Ro from this buffer memory 8.

FIG. 5 indicates data occupation quantity of multiplexed data A that the buffer memory 8 stores or accumulates. Since multiplexed data A is intermittently written into the buffer memory 8 and the multiplexed data A is outputted at constant (fixed) output rate therefrom, data occupation quantity changes. In more practical sense, since, at time period of t0~t1 and time period of t4~t5 (time period Tr), multiplexed data A is written at input rate Ri and multiplexed data A is read out at output rate Ro, data occupation quantity of the buffer memory 8 gradually increases at rate of (Ri–Ro). Further, at time period of t1~t4 and time period of t5~t8 (time period Ts), no multiplexed data A is written and multiplexed data B is read out at output rate Ro. For this reason, data occupation quantity of the buffer memory 8 gradually lowers at rate of –Ro.

In addition, FIG. 4 indicates input rate when multiplexed data different from the multiplexed data (hereinafter called multiplexed data B) recorded on the disc 1 is written into the buffer memory 17 at the time of reproduction. As shown in the FIG. 4 mentioned above, multiplexed data B is intermittently written into the buffer memory 17. In more practical sense, multiplexed data B is inputted at input rate Ri at time period of t2~t3 and time period of t6~t7, and no data is inputted at time period of t0~t2 and time period of t3~t6.

FIG. 8 indicates output rate of multiplexed data B written into the buffer memory 17. As shown in the FIG. 8 mentioned above, multiplexed data B is continuously outputted from the buffer memory 17. In more practical sense, multiplexed data B is outputted at constant output rate Ro from the buffer memory 17.

FIG. 6 indicates data occupation quantity of multiplexed data B that the buffer memory 17 stores (accumulates). Since multiplexed data B is intermittently written into the buffer memory 17, and the multiplexed data B is outputted at constant output rate therefrom, data occupation quantity changes. In more practical sense, at time period of t2~t3 and time period of t6~t7 (period Tr), multiplexed data B is written at input rate Ri and multiplexed data B is read out at output rate Ro. For this reason, data occupation quantity of the buffer memory 17 gradually increases at rate of Ri–Ro. Further, at time period of t0~t2 and time period t3~t6 (period Ts), multiplexed data B is not written and multiplexed data B is read out at output rate Ro. For this reason, data occupation quantity of the buffer memory 17 gradually lowers at rate of –Ro.

In this case, if quantity of data which is or are intermittently written into the buffer memories 8, 17 and quantity of data which are read out at constant (fixed) rate from the buffer memories 8, 17 are balanced, the buffer memories 8, 17 are caused to undergo repetition of write operation and read operation in the state where overflow or underflow does not take place.

However, in the case where, at the time of recording onto the disc 1, continuous data, i.e., data to be continuously outputted at the time of reproduction is recorded onto the disc 1 in an extremely distributed manner or in an extremely finely divided manner, even if buffer memories 8, 17 are used at the time of reproduction which will be carried out later, continuity of data cannot be guaranteed, resulting in the possibility that continuous reproduction of data cannot be realized.

For this reason, in the disc recording/reproducing unit (apparatus) of the embodiment of this invention, constraint is provided with respect to distribution and/or fine division of data at the time of recording.

Explanation will be given in more generalized manner with reference to the example of FIGS. 3 to 8 in connection with this constraint.

At the time of reproduction of the disc 1, minimum write time when multiplexed data A or multiplexed data B is intermittently with respect to the buffer memories 8, 17 from the disc 1 is assumed to be Tr (sec.). For example, in the case where write control as shown in FIG. 3 is carried out, minimum write time Tr with respect to the buffer memory 8 results in either shorter one of the time period of t0~t1 and the time period of t4~t5. Moreover, for example, in the case where write control as shown in FIG. 4 is carried out, minimum write time Tr with respect to the buffer memory 17 results in either shorter one of the time period of t2~t3 and the time period of t6~t7.

Further, at the time of reproduction of the disc 1, time (period) from the time when write operation into the buffer memory 8 of multiplexed data A is completed from the disc 1 until write operation of multiplexed data A is started for a second period, or time (period) from the time when write operation into the buffer memory 17 of multiplexed data B is completed from this disc 1 until write operation into the buffer memory 8 of multiplexed data A is once (temporarily) carried out and write operation of the multiplexed data B is started for a second time is assumed to be Ts (sec.).

In addition, it is assumed that buffer sizes of the buffer memories 8, 17 are assumed to be B (bits), input rate of multiplexed data A to the buffer memory 8 and input rate of multiplexed data B to the buffer memory 17 at the time of reproduction are assumed to be Ri (bits/sec.), and outputs rate of multiplexed data A from the buffer memory 8 and output rate of multiplexed data B from the buffer memory 17 similarly at the time of reproduction are assumed to be Ro (bit/sec.).

At this time, the relationship of input/output rate of the buffer memories 8, 17 can be expressed by the following formula.

$$Ri \times Tr = Ro \times 2(Tr+Ts)$$

It is required that, in such a relationship, buffer size B necessary for continuously outputting multiplexed data A, B at constant (fixed) output rate from the buffer memories 8, 17 satisfies the following condition.

$$B \geq Ro \times Ts$$

In this case, length of this Ts changes in dependency upon the number of multiplexed data to be reproduced at the same time. When the number of multiplexed data to be reproduced at the same time is assumed to be N and seek time of the optical head 3 is assumed to be Tj (sec.), this Ts can be expressed by the following formula.

$$Ts = (N-1) \times Tr + N \times Tj (N=1, 2, 3, 4 \ldots)$$

As understood from this formula, according as the number of multiplexed data to be reproduced at the same time becomes larger, time of Ts becomes longer.

Moreover, the seek time Tj of the optical head 3 depends upon physical data arrangement (assignment) on the disc 1. For example, in the case where data disposed (assigned) at the innermost circumferential portion and the outermost circumferential portion of the disc 1 are continuously read, the maximum seek time is required. Accordingly, in order to continuously output multiplexed data A, B from the buffer memories 8, 17 at constant output rate, there are required buffer memories 8, 17 of size capable of covering (ensuring) the maximum seek time taking place at the time of reproducing all multiplexed data A, B from the disc 1. It is necessary that buffer sizes of the buffer memories 8, 17 are determined on the basis of Ts in which maximum seek time taking place at the time of reproducing multiplexed data A, B from the disc 1 is taken into consideration. For example, when maximum seek time taking place at the time of reproducing multiplexed data A, B from the disc 1 is seek time Tj__max taking place at the time of continuously reading data disposed (assigned) at the innermost circumferential portion and the outermost circumferential portion of the disc 1, Ts is expressed by the following formula.

$$Ts = (N-1) \times Tr + N \times Tj_{13} \max (N=1, 2, 3, 4 \ldots)$$

In this case, in order to continuously output multiplexed data A, B from the buffer memories 8, 17 at a constant output rate at the time of reproduction, it is necessary that multiplexed data A, B of Ro×Ts or more are stored in the buffer memories 8, 17 immediately before start of seek operation of the optical head 3. As one technique for allowing the buffer memories 8, 17 to store thereinto such multiplexed data A, B of Ro×Ts or more immediately before start of seek operation, it is conceivable to record, in a distributed manner, multiplexed data A, B every data quantity of size (capacity) of minimum continuous recording unit Ba (bits) indicated by the following formula or more.

$$Ba = \frac{Ri \times Ro \times Ts}{Ri - Ro}$$

Namely, in the case where each buffer size of the buffer memories 8, 17 is B (bits) or more, and continuous space (blank) areas capable of continuously disposing (assigning) data of Ba (bits) or more exists on the disc 1 at the time of recording, the system controller 9 of the disc recording/reproducing unit (apparatus) of the embodiment of this invention sets the above-mentioned Ba as minimum continuous recording unit to make a control to dispose (assign) multiplexed data into single continuous space area on the disc 1 in data units of this minimum continuous recording unit Ba or more to record such multiplexed data A, B. In more practical sense, the system controller 9 controls the buffer memory controller 7 so that the multiplexed data A, B of the minimum continuous recording unit Ba are read out from the buffer memories 8, 17 at the time of recording, and to control, in order to record such data, the magnetic head 14 and its peripheral circuit and the optical head 3 and its peripheral circuit. Thus, generation of continuous data can be realized at the time of reproduction which will be carried out later.

Moreover, in such cases that data less than Ba (bits) can be only continuously disposed (assigned) on the disc 1, such an approach is employed to provide (set), in order to shorten the maximum seek time of the optical head 3 at the time of reproduction, upper limit with respect to relative distance between data disposed (assigned) in a distributed manner (relative distance between data between distributed space areas) on the disc 1 thus to record multiplexed data A, B. Namely, in the case where space area capable of continuously disposing (assigning) data of Ba (bits) or more does not exist on the disc 1 even if each buffer size of the buffer memories 8, 17 is B (bits) or more, the system controller 9 carries out a control to set (give) upper limit with respect to relative distance between data disposed (assigned) in a distributed manner (relative distance between data between distributed space areas) on the disc 1, thus to record multiplexed data A, B. In more practical sense, the system controller 9 controls, at the time of recording, the magnetic head 14 and its peripheral circuit and the optical head 3 and its peripheral circuit so that relative distance between data is caused to fall within the above-mentioned upper limit. Thus, generation of continuous data can be realized at the time of reproduction which will be carried out later.

Further, also in the case where each buffer size of the buffer memories 8, 17 is less than B (bits), such an approach is employed to provide (set) upper limit with respect to relative distance between data disposed (assigned) in a distributed manner on the disc 1 so that the maximum seek time of the optical head 3 at the time of reproduction becomes short, thus to record multiplexed data A, B. Namely, in the case where each buffer size of the buffer memories 8, 17 is less than B (bits) even if space areas capable of disposing (assigning) data of Ba (bits) or more exist on the disc 1, the system controller 9 makes a control to provide (set) upper limit with respect to relative distance between data disposed (assigned) in a distributed manner (relative distance between data between distributed space areas) on the disc 1 so that the above-mentioned Ts is shortened, thus to record multiplexed data A, B. In more practical sense, the system controller 9 controls the magnetic head 14 and its peripheral circuit and the optical head 3 and its peripheral circuit so that relative distance between data is caused to fall within the above-mentioned upper limit. Thus, generation of continuous data at the time of reproduction which will be carried out later can be realized.

Explanation will be given with reference to the flow charts shown in FIGS. 9 to 16 in connection with processing content when multiplexed data A, B are recorded onto the disc 1 and processing content when multiplexed data A, B recorded on the disc 1 are reproduced in the disc recording/reproducing unit (apparatus) of the embodiment of this invention.

Initially, the recording processing will be explained.

Figure 9:
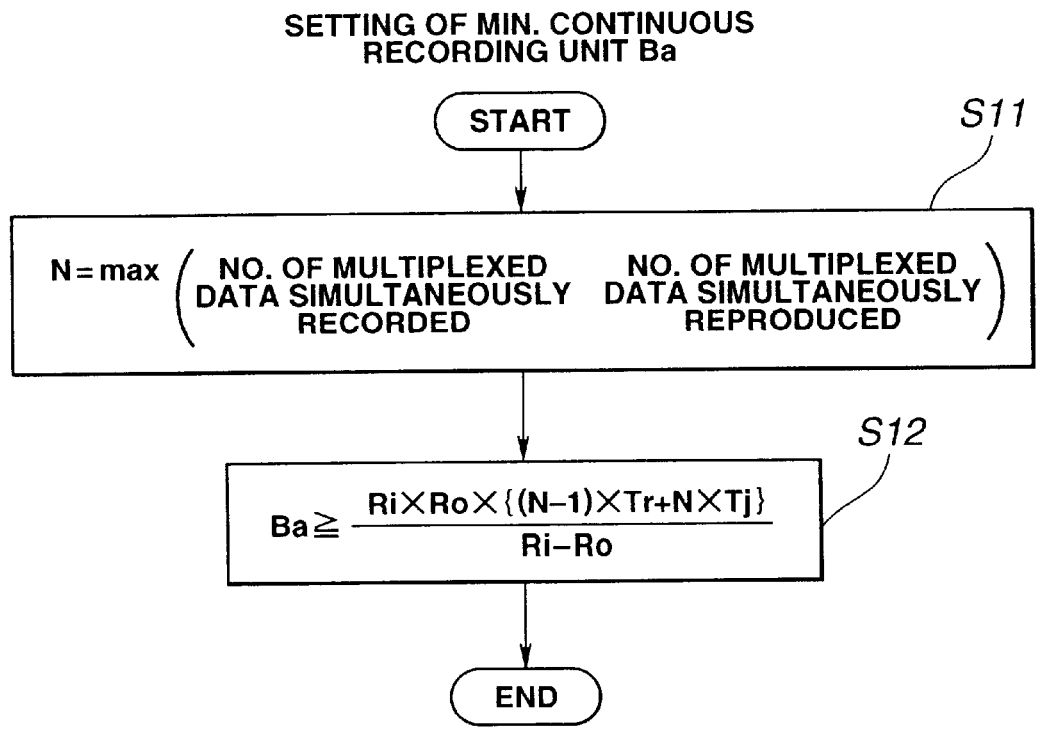
FIG. 9 is a flow chart indicating setting processing content of minimum continuous recording unit by system controller at the time of recording of the disc.

In recording multiplexed data A and multiplexed data B onto the disc 1, the system controller 9 carries out processing as indicated at step S11 and step S12 of FIG. 9 to carry out setting of minimum continuous recording unit Ba.

At the step S11, the system controller 9 sets, as N, value of either larger one of the number of multiplexed data recorded at the same time onto the disc 1 and the number of multiplexed data reproduced at the same time from the disc 1.

Subsequently, at the step S12, the system controller 9 computes (calculates) the following formula to determine minimum continuous recording unit Ba.

$$Ba \geq \frac{Ri \times Ro \times \{(N-1) \times Tr + N \times Tj\}}{Ri - Ro}$$

Figure 10:
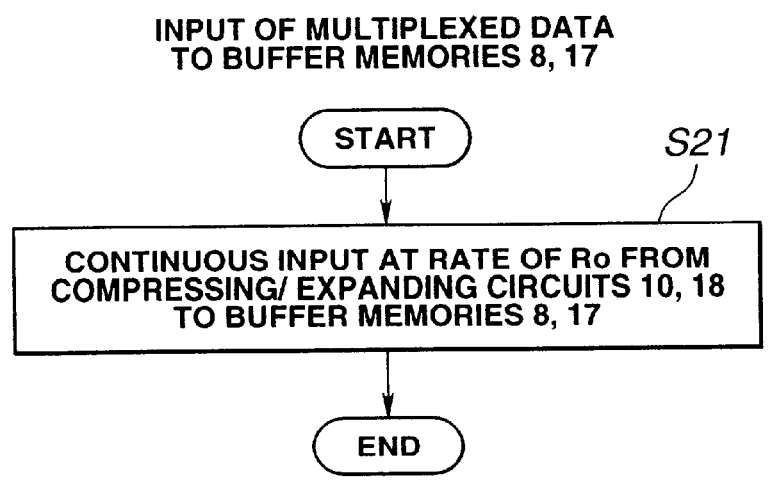
FIG. 10 is a flow chart indicating input processing content to the buffer memories of the multiplexed data A and the multiplexed data B by buffer memory controller at the time of recording of the disc.
Figure 11:
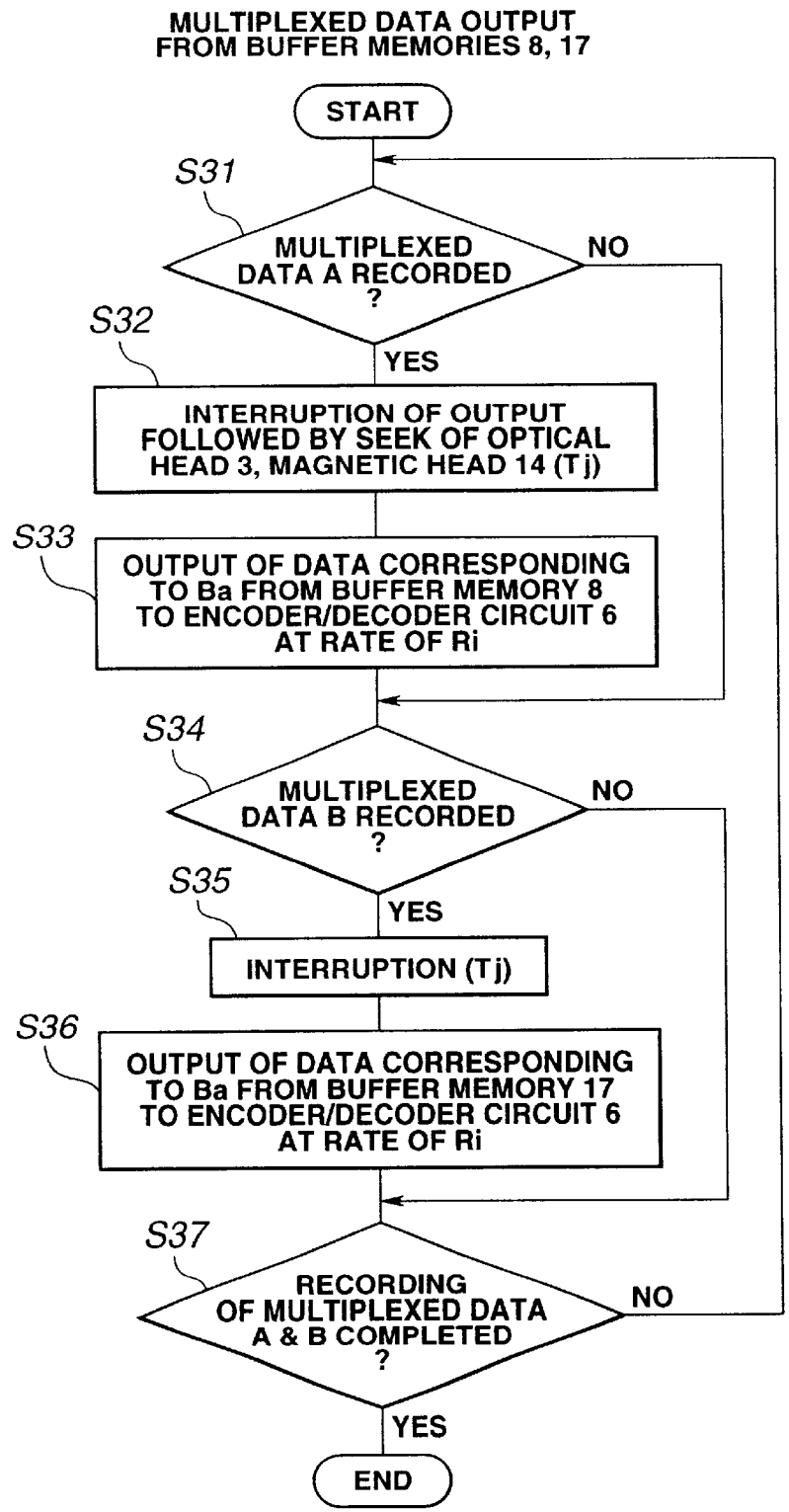
FIG. 11 is a flow chart indicating output processing content from the buffer memories of the multiplexed data A and the multiplexed data B by the buffer memory controller at the time of recording of thr disc.

Further, in recording multiplexed data A and multiplexed data B onto the disc 1, the buffer memory controller 7 carries out input processing to the buffer memories 8, 17 as shown at step S21 of FIG. 10 and output processing from the buffer memories 8, 17 as shown at step S31 to step S37 of FIG. 11.

At the step S21, the buffer controller 7 continuously inputs, to the respective buffer memories 8, 17, at constant rate of Ro, multiplexed data A and multiplexed data B delivered from the compressing/expanding circuits 10, 18.

Furthermore, at the step S31, the buffer memory controller 7 judges whether or not multiplexed data A is recorded. In the case where multiplexed data A is not recorded, the processing operation proceeds to step S34. In the case where multiplexed data A is recorded, the processing operation proceeds to the step S32.

At the step S32, the buffer memory controller 7 interrupts output of multiplexed data A followed by seek operation of the optical head 3 and the magnetic head 14.

Subsequently, at the step S33, the buffer memory controller 7 outputs, at rate of Ri, multiplexed data A corresponding to minimum continuous recording unit Ba from the buffer memory 8 to the encoder/decoder circuit 6.

Subsequently, at the step S34, the buffer memory controller 7 judges whether or not multiplexed data B is recorded. In the case where multiplexed data B is not recorded, the processing operation proceeds to the step S37. In the case where multiplexed data B is recorded, the processing operation proceeds to the step S35.

At the step S35, the buffer memory controller 7 interrupts output of multiplexed data B followed by seek operations of the optical head 3 and the magnetic head 4.

Subsequently, at the step S37, the buffer memory controller 7 judges whether or not recording operations of multiplexed data A and multiplexed data B have been completed. In the case where recording operations of the multiplexed data A and the multiplexed data B have not been completed, the processing operation returns to the step S31 to repeat processing from the step S31 to the step S36. On the other hand, in the case where recording operations of the multiplexed data A and the multiplexed data B have been both completed, the processing (operation) is completed.

Figure 12:
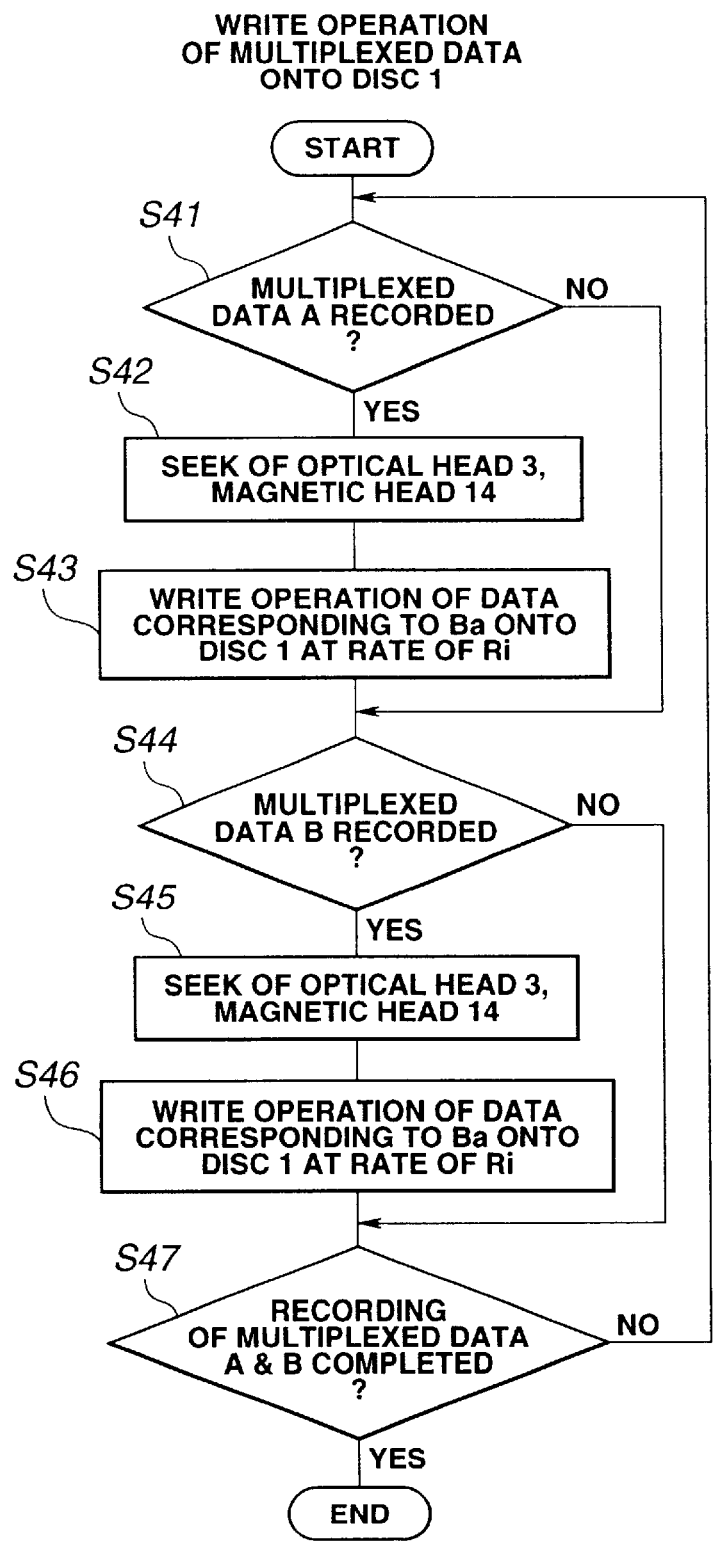
FIG. 12 is a flow chart indicating write processing content of multiplexed data A, B onto the disc by the system controller at the time of recording of the disc.

Further, in recording the multiplexed data A and the multiplexed data B onto the disc 1, the system controller 9 carries out recording processing of multiplexed data A, B with respect to the disc 1 as shown at steps S41 to step S47 of FIG. 12.

At the step S41, the system controller 9 judges whether or not multiplexed data A is recorded. In the case where multiplexed data A is not recorded, the processing operation proceeds to step S44. In the case where multiplexed data A is recorded, the processing operation proceeds to the step S42.

At the step S42, the system controller 9 carries out seek operation of the optical head 3 and the magnetic head 14.

Subsequently, at the step S43, the system controller 9 writes, onto the disc 1, at rate of Ri, multiplexed data A corresponding to minimum continuous recording unit Ba delivered from the encoder/decoder circuit 6.

Subsequently, at the step S44, the system controller 9 judges whether or not multiplexed data B is recorded. In the case where the multiplexed data B is not recorded, the processing operation proceeds to step S47. In the case where multiplexed data B is recorded, the processing operation proceeds to the step S45.

At the step S45, the system controller 9 carries out seek operation of the optical head 3 and the magnetic head 14.

Subsequently, at the step S46, the system controller 9 writes, onto the disc 1, at rate of Ri, multiplexed data B corresponding to minimum continuous recording unit Ba delivered from the encoder/decoder circuit 6.

Subsequently, at the step S47, the system controller 9 judges whether or not recording operations of multiplexed data A and multiplexed data B have been completed. In the case where recording operations of multiplexed data A and multiplexed data B have not been completed, the processing operation returns to the step S41 to repeat processing from the step S41 to the step S46. On the other hand, in the case where recording operations of multiplexed data A and multiplexed data B have been both completed, the processing (operation) is completed.

In the disc recording/reproducing unit (apparatus) of the embodiment of this invention, such an approach is employed to carry out processing shown at the step S11 to the step S47 to record multiplexed data A, B onto the disc 1.

The reproduction processing will now be explained.

Figure 13:
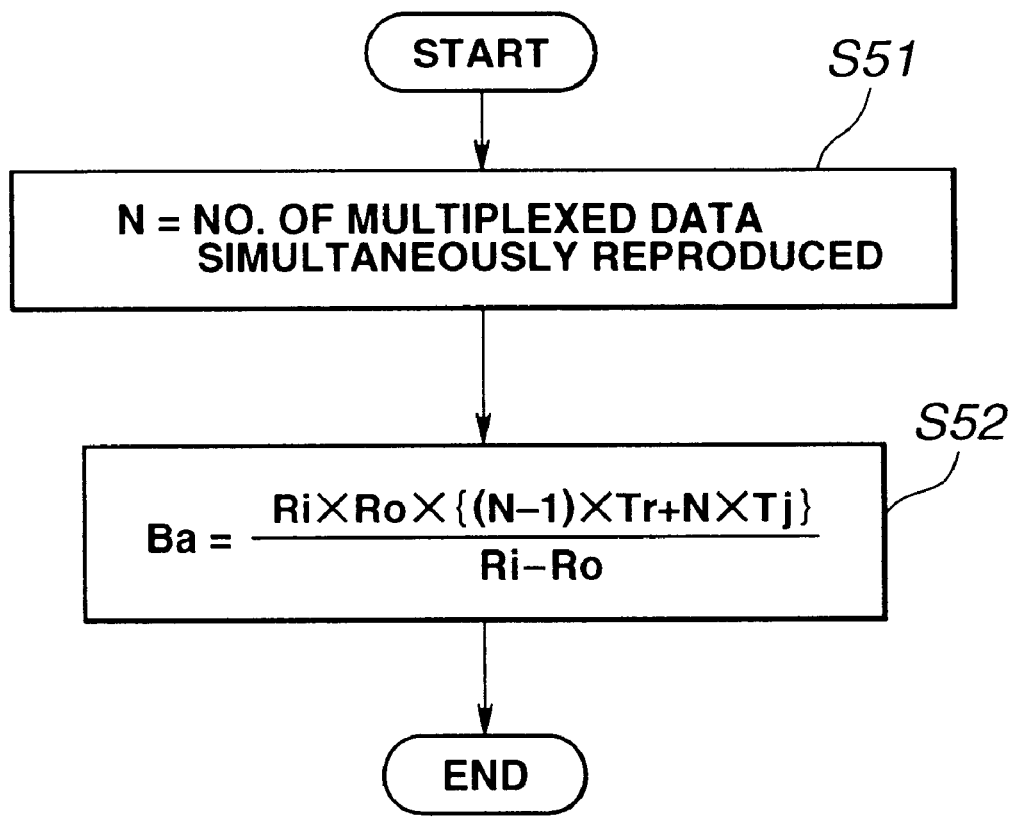
FIG. 13 is a flow chart indicating setting processing content of minimum continuous recording unit by the system controller at the time of reproduction of the disc.

In reproducing multiplexed data A and multiplexed data B from the disc 1, the system controller 9 carries out processing as shown at the step S51 and the step S52 of FIG. 13 to carry out setting of minimum continuous recording unit Ba.

At the step S51, the system controller 9 sets, as N, the number of multiplexed data to be reproduced at the same time from the disc 1.

Subsequently, at the step S52, the system controller 9 computes (calculates) the following formula to determine minimum continuous recording unit Ba.

$$Ba \geq \frac{Ri \times Ro \times \{(N-1) \times Tr + N \times Tj\}}{Ri - Ro}$$

It is to be noted that the system controller 9 may write, on the disc 1, minimum continuous recording unit Ba determined at the time of recording without determining, for a second time, minimum continuous recording unit Ba at the time of reproduction to read such information from the disc 1 thereinto.

Figure 14:
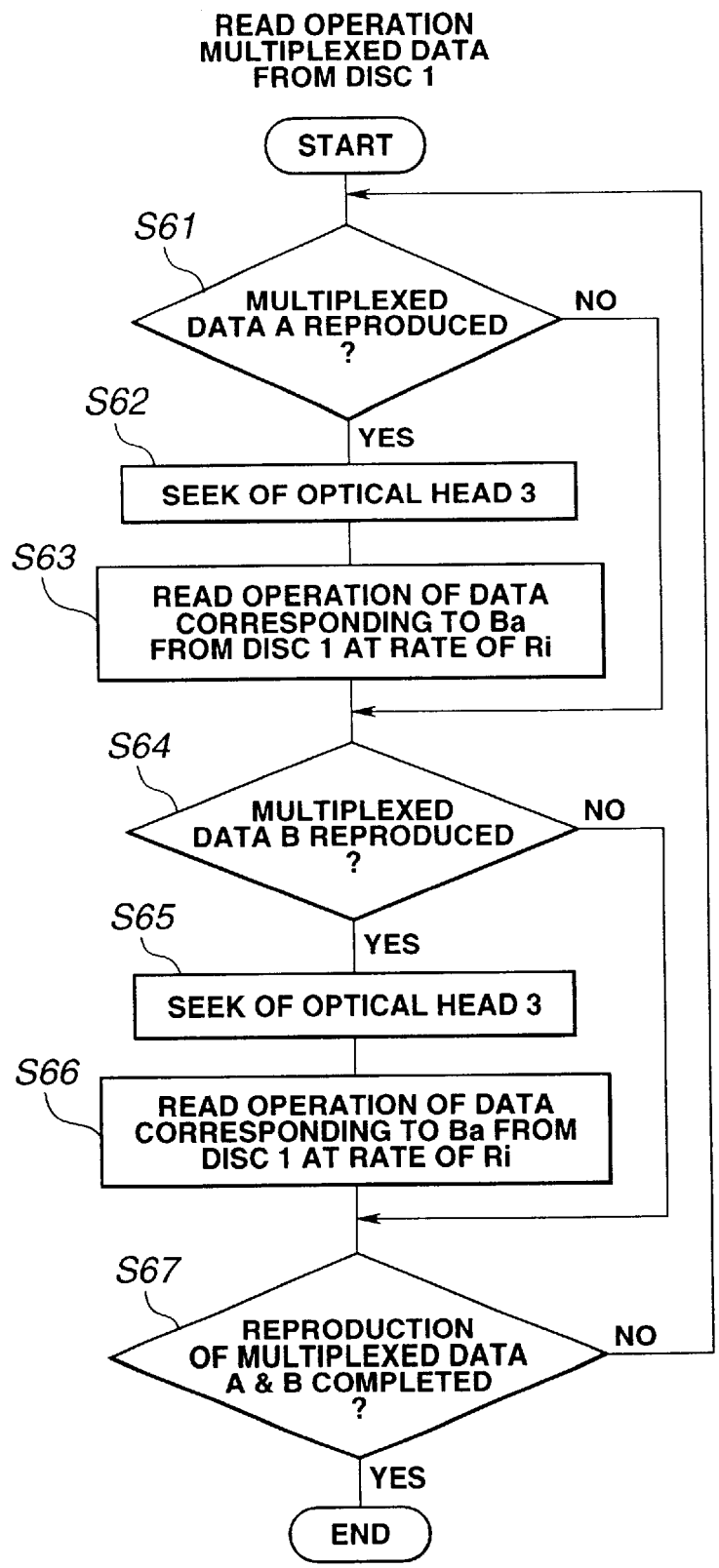
FIG. 14 is a flow chart indicating read processing content of multiplexed data A, B from the disc by the system controller at the time of reproduction of the disc.

Moreover, in reproducing multiplexed data A and multiplexed B from the disc 1, the system controller 9 carries out reproduction processing of multiplexed data A, B with respect to the disc 1 as shown at step S61 to step S67 of FIG. 14.

At the step S61, the system controller 9 judges whether or not multiplexd data A is reproduced. In the case where multiplexed data A is not reproduced, the processing operation proceeds to the step S64. In the case where multiplexed data A is reproduced, the processing operation proceeds to the step S62.

At the step S62, the system controller 9 carries out seek operation of the optical head 3.

Subsequently, at the step S63, the system controller 9 reads out multiplexed data A corresponding to minimum continuous recording unit Ba from the disc 1 at rate of Ri to deliver it to the encoder/decoder circuit 6.

Subsequently, at the step S64, the system controller 9 judges whether or not multiplexed data B is reproduced. In the case where multiplexed data B is not reproduced, the processing operation proceeds to the step S67. In the case where multiplexed data B is reproduced, the processing operation proceeds to the step S65.

At the step S65, the system controller 9 carries out seek operation of the optical head 3.

Subsequently, at the step S66, the system controller 9 reads out, from the disc 1, at rate of Ri, multiplexed data B corresponding to the minimum continuous recording unit Ba to deliver it to the encoder/decoder circuit 6.

Subsequently, at the step S67, the system controller 9 judges whether or not reproduction operations of multiplexed data A and multiplexed data B have been completed. In the case where reproduction operations of multiplexed data A and multiplexed data B have not been completed, the processing operation returns to the step S61 to repeat the processing from the step S61 to the step S66. On the other hand, in the case where reproduction operations of multiplexed data A and multiplexed data B have been both completed, the processing (operation) is completed.

Figure 15:
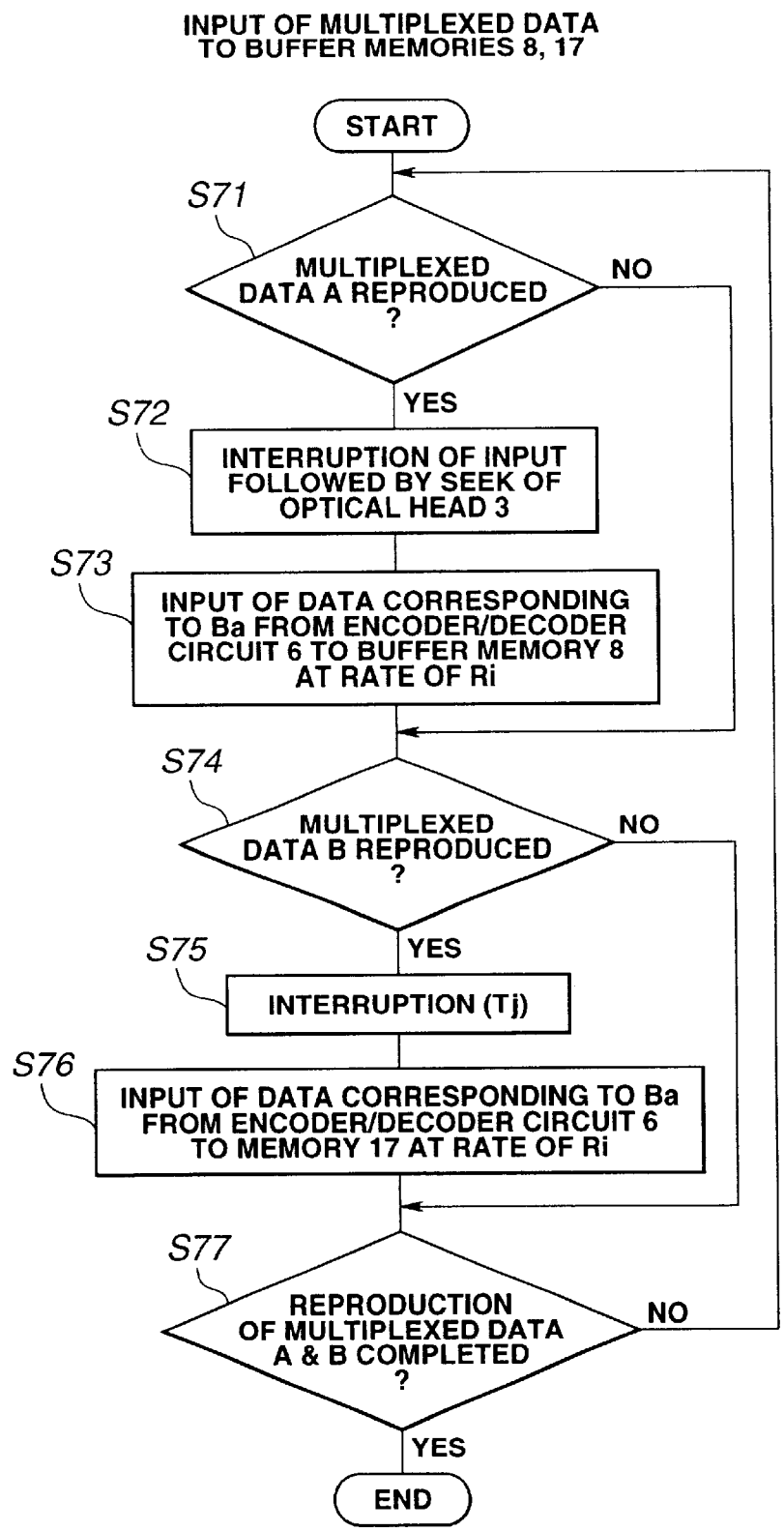
FIG. 15 is a flow chart indicating input processing content to the buffer memories of the multiplexed data A and the multiplexed data B by the buffer memory controller at the time of reproduction of the disc.
Figure 16:
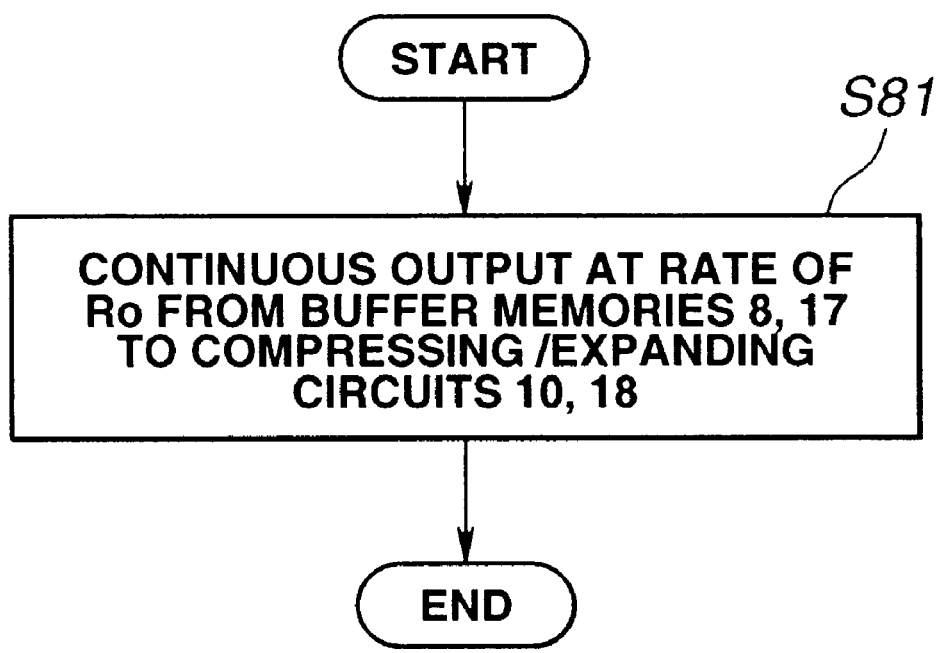
FIG. 16 is a flow chart indicating output processing content from the buffer memories of the multiplexed data A and the multiplexed data B by the buffer memory controller at the time of reproduction of the disc.

Moreover, in reproducing multiplexed data A and multiplexed data B from the disc 1, the buffer memory controller 7 carries out input processing to the buffer memories 8, 17 as shown at step S71 to step S77 of FIG. 15 and output processing from the buffer memories 8, 17 as shown at step S81 of FIG. 16.

At the step S71, the buffer memory controller 7 judges whether or not multiplexed data A is reproduced. In the case where multiplexed data A is not reproduced, the processing operation proceeds to step S74. In the case where multiplexed data A is reproduced, the processing operation proceeds to step the S72.

At the step S72, the buffer memory controller 7 interrupts output of multiplexed data A followed by seek operation of the optical head 3.

Subsequently, at the step S73, the buffer memory controller 7 inputs, at rate of Ri, to the buffer memory 8, multiplexed data A corresponding to the minimum continuous recording unit Ba delivered from the encoder/decoder circuit 6.

Subsequently, at the step S74, the buffer memory controller 7 judges whether or not multiplexed data B is reproduced. In the case where multiplexed data B is not reproduced, the processing operation proceeds to the step S77. In the case where multiplexed data B is reproduced, the processing operation proceeds to the step S75.

At the step S75, the buffer memory controller 7 interrupts output of multiplexed data B followed by seek operation of the optical head 3.

Subsequently, at the step S76, the buffer memory controller 7 inputs, at rate of Ri, to the buffer memory 17, multiplexed data B corresponding to the minimum continuous recording unit Ba from the encoder/decoder circuit 6.

Subsequently, at the step S77, the buffer memory controller 7 judges whether or not reproduction operations of multiplexed data A and multiplexed data B have been completed. In the case where reproduction operations of multiplexed data A and multiplexed data B have not been completed, the processing operation returns to the step S71 to repeat processing from the step S71 to step S76. On the other hand, in the case where reproduction operations of multiplexed data A and multiplexed data B have been both completed, the processing (operation) is completed.

In addition, at the step S81, the buffer memory controller 7 continuously outputs, to the compressing/expanding circuits 10, 18, at constant rate of Ro, multiplexed data A and multiplexed data B stored in the buffer memories 8, 17.

In the disc recording/reproducing unit (apparatus) of the embodiment of this invention, such an approach is employed to carry out the processing indicated at the step S51 to the step S81 as described above to reproduce multiplexed data A, B from the disc 1.

As previously mentioned, in the disc recording/reproducing apparatus of the embodiment of this invention, such an approach is employed to set the minimum continuous recording unit on the basis of the number of plural multiplexed data reproduced at the same time, maximum seek time of the optical head 3 and input/output rates of the buffer memories 8, 17 to record, in a distributed manner, data in which continuous picture and/or musical sound data are multiplexed into space (blank) areas on the disc 1 in accordance with the minimum continuous recording unit. Moreover, in this disc recording/reproducing unit (apparatus), such a further approach is employed to provide upper limit with respect to relative distance between data disposed (assigned) in a distributed manner on the disc 1 on the basis of size (buffer size) of the buffer memories 8, 17 and capacity of continuous space areas on the disc 1 to record, in a distributed manner, data in which continuous picture and/or musical sound data are multiplexed into space areas on the disc 1 in accordance with such upper limit. Thus, in the disc recording/reproducing unit (apparatus) of the embodiment of this invention, unusable space areas on the disc 1 are reduced so that disc capacity can be efficiently used. Moreover, long time continuous picture and/or musical sound data can be recorded onto the disc 1 on real time basis. In addition, continuous multiplexed data can be reproduced at constant output rate from the disc 1.

It is to be noted that while the example where disc recording and reproduction operations are carried out by single (unitary) configuration is taken in the above-mentioned embodiment, the recording unit and the reproducing unit may be of configuration separate with each other. Namely, if recording as described above is carried out by the disc recording unit (apparatus) according to this invention, even in the case where such disc is reproduced later by the disc reproducing unit (apparatus) of separate configuration, continuous data reproduction can be carried out. It is to be noted that in the case where configurations for recording and reproduction are caused to be separate as described above, recording in which buffer size of buffer memory and/or seek time of reproduction head (optical head) are taken into consideration is carried out in the disc recording unit (apparatus), wherein the buffer memory and the reproduction head are included within the disc reproducing unit (apparatus) of separate (different) configuration.

Moreover, while the example where magneto-optical disc is used is taken as an example of rewritable disc-shaped recording medium in the explanation of the embodiment of this invention, other discs, e.g., phase change type optical disc, floppy disc or hard disc, etc. may be used as rewritable disc-shaped recording medium in this invention. Further, the example of data in which various data continuous in time and/or capacity, e.g., picture data and musical sound data are multiplexed (hereinafter simply referred to as multiplexed data) is taken as data to be recorded and/or reproduced with respect to rewritable disc-shaped recording medium in this embodiment, and the example where such picture data and musical sound data are compressed by a predetermined compression encoding system is taken. However, as a matter of course, it is not necessarily required that multiplexing and/or compression are implemented to data to be recorded and/or reproduced. Further, while explanation has been given in connection with the disc recording/reproducing unit (apparatus) adapted for recording and/or reproducing two multiplexed data at the same time in the embodiment of this invention, this invention may be applied to apparatus adapted for recording and/or reproducing three multiplexed data or more at the same time. Furthermore, while the example where recording of two multiplexed data and reproduction of two multiplexed data are independently processed is taken in the embodiment of this invention, processing for reproducing one or plural multiplexed data may be carried out in a manner in parallel to recording of one or plural multiplexed data. In addition, the number of multiplexed data to be recorded or reproduced at the same time may change every recording or reproduction.

What is claimed is:

1. A data recording apparatus comprising:
   one or more buffer memories for temporarily storing continuous picture and/or speech data inputted thereto;
   a recorder for recording the continuous picture and/or speech data stored in the one or more buffer memories on a recording medium; and
   a controller for controlling said recorder so that, the size of a recording unit corresponds to the amount of continuous picture and/or speech data recorded by said recorder.

2. The data recording apparatus according to claim 1 wherein said controller enlarges the size of the recording unit as the number of said continuous picture and/or speech data recorded by said recorder is increased.

3. A data recording method comprising the steps of:
   temporarily storing said continuous picture and/or speech data as it is input;
   recording the continuous picture and/or speech data stored at the storing step on a recording medium; and
   performing control so that, if there are a plurality of continuous picture and/or speech data recorded at the recording step, a size of a recording unit will be larger than that when there is only one continuous picture and/or speech data.

4. The data recording method according to claim 3 wherein the performing step enlarges the size of the recording unit as the number of said continuous picture and/or speech data recorded at the recording step is increased.

5. A data recording and/or reproducing apparatus comprising:
   a reproducing unit for reproducing continuous picture and/or speech data recorded on a recording medium;
   one or more buffer memories for temporarily storing the continuous picture and/or speech data inputted thereto and the continuous picture and/or speech data reproduced by the reproducing unit;
   a recorder for recording the continuous picture and/or speech data stored in the one or more buffer memories on the recording medium; and
   a controller for controlling the recorder so that, if the sum of the continuous picture and/or speech data recorded by said recorder and the continuous picture and/or speech data reproduced by said reproducing unit is plural, the size of a recording unit will be larger than that for said sum being single.

6. The data recording and/or reproducing apparatus according to claim 5 wherein said controller enlarges the size of the recording unit as the number of said sum of said moving continuous picture and/or speech data recorded by said recorder and the continuous picture and/or speech data reproduced by said reproducing unit is increased.

7. A data recording and/or reproducing method comprising the steps of:
   reproducing continuous picture and/or speech data recorded on a recording medium;
   temporarily storing the continuous picture and/or speech data as it is input and the continuous picture and/or speech data reproduced at the reproducing step;
   recording the continuous picture and/or speech data stored at the storing step on the recording medium; and
   performing control so that, if the sum of the continuous picture and/or speech data stored at the storing step and the continuous picture and/or speech data reproduced at the reproducing step is plural, the size of a recording unit will be larger than that for said sum being single.

8. The data recording and/or reproducing method according to claim 7 wherein said performing step enlarges the size of the recording unit as the number of said sum of said continuous picture and/or speech data recorded at the recording step and the continuous picture and/or speech data reproduced at the reproducing step is increased.

9. A data recording apparatus comprising:
   one or more buffer memories for temporarily storing continuous picture and/or speech data inputted thereto;
   a recorder for recording the continuous picture and/or speech data stored in the one or more buffer memories on a recording medium; and
   a controller for controlling said recorder so that, if the continuous picture and/or speech data recorded by said recorder are recorded in a recording unit smaller than a set size, a relative distance between data will be smaller than a pre-set distance.

10. A data recording method comprising the steps of:
    temporarily storing continuous picture and/or speech data as it is input;
    recording the continuous picture and/or speech data stored at the storage step on a recording medium; and
    controlling said recording so that, if the continuous picture and/or speech data are recorded in a recording unit smaller than a set size, a relative distance between data will be smaller than a pre-set distance.

11. A data recording and/or reproducing apparatus comprising:
    a reproducing unit for reproducing continuous picture and/or speech data recorded on a recording medium;
    one or more buffer memories for temporarily storing the continuous picture and/or speech data inputted thereto and the continuous picture and/or speech data reproduced by the reproducing unit;
    a recorder for recording the continuous picture and/or speech data stored in the one or more buffer memories on a recording medium; and
    a controller for controlling the recorder so that, if the continuous picture and/or speech data recorded by said recorder and the continuous picture and/or speech data reproduced by said reproducing unit are recorded in a recording unit smaller than a set size, a relative distance between data will be smaller than a pre-set distance.

12. A data recording and/or reproducing method comprising the steps of:
    reproducing continuous picture and/or speech data recorded on a recording medium;
    temporarily storing inputted continuous picture and/or speech data and the continuous picture and/or speech data reproduced at the reproducing step;
    recording the inputted continuous picture and/or speech data stored at the storing step on the recording medium; and
    controlling a recording unit so that, if the continuous picture and/or speech data recorded at the recording step and the continuous picture and/or speech data reproduced at the reproducing step are recorded in a recording unit smaller than a set size, a relative distance between data will be smaller than a pre-set distance.

13. A data recording and/or reproducing apparatus comprising:
    a reproducing unit for reproducing continuous picture and/or speech data recorded on a recording medium;
    one or more buffer memories for temporarily storing the continuous picture and/or speech data inputted thereto and the continuous picture and/or speech data reproduced by the reproducing unit;
    a recorder for recording the continuous picture and/or speech data stored in the one or more buffer memories on a recording medium; and
    a controller for controlling the recorder and/or reproducing unit such that the continuous picture and/or speech data are recorded by said recorder into a recording unit and/or reproduced therefrom by said reproducing unit,
    wherein a minimum continuous recording unit (Ba) becomes larger in accordance with Ts, in which Ts=

$(N-1) \times Tr + N \times Tj$ ($N=1, 2, 3, 4, \ldots$) where N is the number of data, Tr is minimum read time, and Tj is seek time of a recording and/or reproducing head associated with the recorder and/or reproducing unit.

14. A data recording and/or reproducing apparatus comprising:

a reproducing unit for reproducing continuous picture and/or speech data recorded on a recording medium;

one or more buffer memories for temporarily storing the continuous picture and/or speech data inputted thereto and the continuous picture and/or speech data reproduced by the reproducing unit;

a recorder for recording the continuous picture and/or speech data stored in the one or more buffer memories on a recording medium; and a controller for controlling the recorder and/or reproducing unit such that the continuous picture and/or speech data are recorded by said recorder into a recording unit and/or reproduced therefrom by said reproducing unit, wherein a minimum continuous recording unit (Ba) becomes larger in accordance with Tj or Tr, in which Tj is maximum seek time of a reproducing head associated with the reproducing unit during the reproduction of the data, and Tr is minimum read time for reading out the data.

15. A data recording and/or reproducing method comprising the steps of:

reproducing continuous picture and/or speech data recorded on a recording medium by use of a reproducing unit;

temporarily storing into one or more buffer memories the continuous picture and/or speech data inputted thereto and the continuous picture and/or speech data reproduced by the reproducing unit;

recording the continuous picture and/or speech data stored in the one or more buffer memories on a recording medium by use of a recorder; and controlling the recorder and/or reproducing unit such that the continuous picture and/or speech data are recorded by said recorder into a recording unit and/or reproduced therefrom by said reproducing unit, wherein a minimum continuous recording unit (Ba) becomes larger in accordance with Ts, in which $Ts = (N-1) \times Tr + N \times Tj$ ($N=1, 2, 3, 4, \ldots$) where N is the number of data, Tr is minimum read time, and Tj is seek time of a recording and/or reproducing head associated with the recorder and/or reproducing unit.

16. A data recording and/or reproducing method comprising the steps of:

reproducing continuous picture and/or speech data recorded on a recording medium by use of a reproducing unit;

temporarily storing into one or more buffer memories the continuous picture and/or speech data inputted thereto and the continuous picture and/or speech data reproduced by the reproducing unit;

recording the continuous picture and/or speech data stored in the one or more buffer memories on a recording medium by use of a recorder; and controlling the recorder and/or reproducing unit such that the continuous picture and/or speech data are recorded by said recorder into a recording unit and/or reproduced therefrom by said reproducing unit, wherein a minimum continuous recording unit (Ba) becomes larger in accordance with Tj or Tr, in which Tj is maximum seek time of a reproducing head associated with the reproducing unit during the reproduction of the data, and Tr is minimum read time for reading out the data.

* * * * *